United States Patent Office 2,993,914
Patented July 25, 1961

2,993,914
PROCESS FOR THE PRODUCTION OF 3-CHLORO-4-HYDROXYTETRAHYDROFURAN
Edwin George Edward Hawkins, Lower Kingswood, England, assignor to The Distillers Company Limited, Edinburgh, Scotland, a British company
No Drawing. Filed May 5, 1958, Ser. No. 732,796
Claims priority, application Great Britain May 31, 1957
9 Claims. (Cl. 260—347.8)

The present invention relates to the production of 3-chloro-4-hydroxytetrahydrofuran. This compound exists in two isomeric forms, both of which can be produced according to the process of the present invention.

The high boiling isomer of 3-chloro-4-hydroxytetrahydrofuran is known and is produced when chlorine is passed through a solution of 2:5-dihydrofuran dissolved in glacial acetic acid. Such a process does not produce the low boiling isomer.

An object of the present invention is to provide a new process for the production of 3-chloro-4-hydroxytetrahydrofuran. A further object is to provide a process for the production of the low boiling isomer of 3-chloro-4-hydroxytetrahydrofuran.

According to the present invention the process for the production of 3-chloro-4-hydroxytetrahydrofuran comprises heating 1:2-dichloro3:4-dihydroxybutane under neutral or acid conditions whereby hydrogen chloride is eliminated between the terminal hydroxy and chloro groups.

1:2-dichloro-3:4-dihydroxybutane (hereinafter referred to as the butane glycol) can be present in the reaction mixture as such or as a compound which is converted to it under the reaction conditions employed. Examples of such compounds are, for instance, the mono- or di-esters of the butane glycol with carboxylic acids, for example acetic acid and formic acids.

The butane glycol can exist in two isomeric forms and either form can be used in the process of the present invention, each giving rise to the corresponding isomeric form of 3-chloro-4-hydroxytetrahydrofuran (hereinafter referred to as the tetrahydrofuran). A mixture of the two isomers of the butane glycol can be employed. A mixture of the two isomeric forms of the tetrahydrofuran can be separated into its component isomers by fractional distillation.

The cyclisation of both isomeric forms of the butane glycol to produce corresponding isomeric tetrahydrofurans can be brought about under a wide variety of conditions. Useful rates of conversion are obtained if the butane glycol is heated above about 70° C. There is no upper limit to the temperature of the reaction provided that the product is removed before extensive decomposition occurs. Generally it is unnecessary to employ temperatures greater than 250° C. The reaction mixture must be either neutral or acid, i.e. it has a pH value less than 8. The pH value of non-aqueous reaction mixtures is defined as the pH value of an equal volume of water when shaken with the reaction mixture.

One isomeric form of the butane glycol is a solid with a melting point of approximately 70° C. If this solid glycol is heated, preferably above 180° C., for instance in the range 180–200° C., hydrogen chloride is eliminated and the corresponding form of the tetrahydrofuran is obtained as a liquid boiling in the range 87–90° C. at 15 mm. of mercury pressure. The second form of the butane glycol is a solid with a melting point of approximately 65° C. and when treated in a similar manner it gives rise to the isomeric tetrahydrofuran as a liquid boiling in the range 100–105° C. at 15 mm. of mercury pressure. The two isomeric forms of the tetrahydrofuran are readily distinguished by spectroscopic analysis.

The two isomers have some different main absorptions by which their relative proportions in a mixture can be estimated. The main absorptions for the two isomers are as follows (the positions being given in wave numbers):

| High boiling isomer | Low boiling isomer |
|---|---|
| 903 cm.$^{-1}$ | 905 cm.$^{-1}$ |
| 967 cm.$^{-1}$ | 1,002 cm.$^{-1}$ |
| 1,082 cm.$^{-1}$ | 1,082 cm.$^{-1}$ |
|  | 1,125 cm.$^{-1}$ |
| 2,890 cm.$^{-1}$ | 2,890 cm.$^{-1}$ |
| 2,956 cm.$^{-1}$ | 2,956 cm.$^{-1}$ |
| 3,380 cm.$^{-1}$ | 3,590 cm.$^{-1}$ |

The common main absorption at 1082 is that usually associated with a five membered ring containing a carbonyl group and those at 2890 and 2956 are both associated with carbon-hydrogen bonds.

The cyclisation reaction can be effected in the presence of liquid diluents, for example, water and/or monohydric alcohols. Under such conditions the reaction is most suitably carried out by heating the reaction mixture under conditions such that the liquid diluent refluxes. This method of operation is particularly useful when the butane glycol is in the form of a mono- or di-ester of a carboxylic acid because the appropriate hydrolysis can be carried out in the same reaction medium and the free glycol so produced then eliminates hydrogen chloride to form the tetrahydrofuran. For example when the formic acid ester of a mixture of the two isomeric forms of the butane glycol is heated in boiling water hydrolysis occurs and the two isomeric forms of the tetrahydrofuran are produced. The hydrolysis reaction is generally faster than the rate of conversion of the butane glycol to the tetrahydrofuran and consequently, if the reaction is stopped, there will usually be uncyclised butane glycol present in the reaction mixture.

In order to bring about the production of the butane glycol from a mono- or di-carboxylic acid ester of the butane glycol using an alcoholic medium it is advantageous to add an alcoholysis catalyst to the reaction mixture in order to increase the rate of the alcohol interchange reaction which releases the butane glycol. Suitable catalysts are sulphonic acids such as p-toluene sulphonic acid, and mineral acids such as sulphuric acid. This alcoholysis reaction may be faster than the rate of conversion of the butane glycol to the tetrahydrofuran and consequently, when the reaction is stopped, some uncyclised butane glycol may be present in the reaction mixture.

A convenient raw material from which the butane glycol can be obtained is 1:2-dichlorobutene-3. This compound, in common with other ethylenically unsaturated compounds, yields either the corresponding epoxide and/or half ester of the corresponding glycol when reacted with hydrogen peroxide in the presence of a lower carboxylic acid. This type of "hydroxylation" reaction is well known and it proceeds readily in the present case using known hydroxylation reaction conditions. Preferably the hydroxylation of 1:2-dichlorobutene-3 is carried out in the presence of formic acid and most suitably the 1:2-dichlorobutene-3 is reacted with hydrogen peroxide in the presence of excess formic acid which acts as a solvent in which to carry out the reaction. The temperature of the reaction is generally in the range 10–100° C., preferably 30–60° C. Under these conditions the main product of the reaction is a mixture of the monoformic acid esters of the butane glycol, together with some diacid esters and some unesterified butane glycol. Esters of both isomeric forms of the butane glycol are produced in this reaction.

If the hydroxylation reaction of 1:2-dichlorobutene-3 is carried out in the presence of less than one molar proportion of formic acid, for example ¼ to ½ of a molar proportion at about 60° C., a high proportion of the corresponding epoxide is formed. This material can readily be hydrolysed to the butane glycol for use in the process of the present invention.

The epoxy compound obtained from 1:2-dichlorobutene-3 and each of the mono-esters of the corresponding glycol can exist in two isomeric forms corresponding to the high and low boiling isomers of the tetrahydrofuran produced according to the present invention. There is no need to effect separation of any of the isomers at any of the intermediate stages in the production of the tetrahydrofuran because any separation required is most readily effected with the two isomers of the tetrahydrofuran itself.

Both isomeric forms of 3-chloro-4-hydroxytetrahydrofuran produced according to the present invention and their esters are valuable solvents and for most purposes there is no need to separate them. The products obtained by esterifying the free hydroxyl group with a carboxylic acid are useful plasticisers for polymeric resins. For example a sample of mixed isomers of 3-chloro-4-hydroxytetrahydrafuran was esterfied with adipic acid to give the adipate as a free flowing liquid. This was readily compatible with polyvinyl chloride and was a good plasticiser therefor in all proportions.

The following examples illustrate the preparation of 3-chloro-4-hydroxytetrahydrofuran according to the present invention.

*Example 1*

1:2-dichlorobutene-3 (300 g.) and aqueous formic acid (90%; 1000 g.) are stirred together at 45° C. and aqueous hydrogen peroxide (85%; 221 g.) added gradually over 1 hour. The mixture is stirred for a further 22 hours at about 40° C. at the end of which time the hydrogen peroxide has been consumed almost completely. The water and formic acid are removed under reduced pressure to leave a residue (399 g.) consisting primarily of the butane glycol monoformate. To this residue is added ethanol (500 cc.) and p-toluene sulphonic acid (4 g.) and the mixture heated under reflux with very slow take-off of the ethyl formate and hydrogen chloride through a helices-packed column. As the ethyl formate (145 g.) is distilled, some of the formed butane glycol (M.P. ca. 70° C.) is converted under the acid conditions to the desired isomeric tetrahydrofurans according to the invention. The bulk of the remaining ethanol is removed by distillation and the product flashed off from the catalyst and re-distilled to separate the desired tetrahydrofurans from unconverted butane glycol. Four distillation fractions and a residue are finally obtained as follows:

| | Grams |
|---|---|
| Fraction 1, B.P. 87–90° C./11 mm. | 53.0 |
| Fraction 2, B.P. 90–98° C./11 mm. | 20.6 |
| Fraction 3, B.P. 98–103° C./11 mm. | 13.2 |
| Fraction 4, B.P. 103–105° C./11 mm. | 54.3 | and 95.9 grams of residue which gives a yield of 47 grams of crystalline butane glycol (1:2-dichloro-3:4-dihydroxybutane).

Spectroscopic analysis indicates that fractions 1 and 4 are substantially the low-boiling and high-boiling isomers respectively of 3-chloro-4-hydroxytetrahydrofuran and that fractions 2 and 3 are mixtures thereof.

Substantially similar results can be obtained by repeating Example 1 using aqueous acetic acid in place of the aqueous formic acid in the "hydroxylation" stage of the reaction. Under these conditions the rate of "hydroxylation" is somewhat reduced.

*Example 2*

The solid glycol (M.P. ca. 70° C.) of Example 1 (10 g.) is heated under reflux with water (50 cc.) for 2 hours, i.e. initially under neutral conditions. The water is then removed under reduced pressure and the residue distilled to give a fraction (4.4 g.), B.P. 83–85°/11 mm., consisting of the low boiling isomer of 3-chloro-4-hydroxytetrahydrofuran. No high-boiling isomer of 3-chloro-4-hydroxytetrahydrofuran is produced from this glycol.

*Example 3*

The solid glycol (M.P. ca. 70° C.) of Example 1 (3 g.) is heated at 180–200° for ½ hour. The material increases in colour and hydrogen chloride is evolved. Distillation gives material (1.5 g.), with B.P. 87–90°/15 mm., identified by spectroscopic means as the low-boiling isomer of 3-chloro-4-hydroxytetrahydrofuran. The phenyl urethane derivative of this isomer has a melting point of 132–133° C.

*Example 4*

The mixed isomers of 1:2-dichloro-3-4-epoxybutane of Example 1, fractions 2 and 3, (14 g.) and formic acid (98–100%; 5 g.) are heated on a water bath for 1 hour, then water (50 cc.) added and the acidic mixture heated under reflux for 2 hours. Hydrolysis of the epoxide ring occurs and the produced butane glycol is converted under the acidic conditions of the reaction mixture to a mixture of the isomers of the tetrahydrofuran. Distillation finally gives two fractions and a residue as follows:

| | Grams |
|---|---|
| Fraction 1, B.P. 86–95° C./13 mm. | 1.7 |
| Fraction 2, B.P. 95–100° C./13 mm. | 4.2 | and 2.7 grams of a residue. Spectroscopic analysis indicates that fraction 1 contains primarily the low-boiling isomer of 3-chloro-4-hydroxytetrahydrofuran with a small proportion of high-boiling isomer and that fraction 2 contains primarily the high-boiling isomer with a small proportion of low-boiling isomer.

*Example 5*

Solid butane glycol (M.P. ca. 65°) (2.6 g.) is heated at 180–200° for ¾ hour. Hydrogen chloride is given off and the colour of the liquid darkens. Distillation gives material (1.1 g.), B.P. 101–101.5°/14 mm., which can be identified by spectroscopic means as primarily the high-boiling isomer of 3-chloro-4-hydroxytetrahydrofuran.

I claim:

1. A process which comprises heating to a temperature above 70° C., 1:2-dichloro-3:4-dihydroxybutane at a pH less than 8 whereby hydrogen chloride is eliminated between the terminal hydroxy and chloro groups thereof to produce 3-chloro-4-hydroxytetrahydrofuran.

2. A process as claimed in claim 1, wherein the 1:2-dichloro-3:4-dihydroxybutane is formed in the reaction mixture by the hydrolysis of a lower carboxylic acid ester of the 1:2-dichloro-3:4-dihydroxybutane.

3. A process as claimed in claim 1, wherein the 1:2-dichloro-3:4-dihydroxybutane is heated in the range 180–200° C. in the absence of a diluent.

4. A process as claimed in claim 1 wherein the process is carried out by refluxing in the presence of water.

5. A process as claimed in claim 1, wherein the 1:2-dichloro-3:4-dihydroxybutane is formed by the alcoholysis of an ester selected from the group consisting of acetic acid and formic acid esters of 1:2-dichloro-3:4-dihydroxybutane in the presence of an acidic alcoholysis catalyst.

6. A process as claimed in claim 5, wherein the alcoholysis catalyst is a member of the group consisting of p-toluene sulphonic acid and sulphuric acid.

7. A process for the production of 3-chloro-4-hydroxytetrahydrofuran which comprises heating to a temperature in the approximate range 10–100° C., 1:2-dichlorobutene-3 with hydrogen peroxide in the presence of a lower carboxylic acid containing not more than two carbon atoms to produce a mono-ester of 1:2-dichloro-3:4-dihydroxybutane, and heating said mono-ester to a temperature above 70° C. at a pH value less than 8.

8. A process for the production of 3-chloro-4-hydroxytetrahydrofuran which comprises heating to a temperature in the approximate range 10–100° C., 1:2-dichlorobutene-3 with hydrogen peroxide in the presence of a lower carboxylic acid containing not more than two carbon atoms to produce 1:2-dichloro-3:4-epoxybutane, converting the 1:2-dichloro-3:4-epoxybutane to a member selected from the group consisting of 1:2-dichloro-3:4-dihydroxybutane, mono- and di-esters of lower carboxylic acid esters thereof and mixtures of said compounds, and heating said member at a temperature above 70° C. at a pH value less than 8.

9. A process which comprises mixing 1:2-dichlorobutene-3 with aqueous formic acid and hydrogen peroxide at a temperature between 10 and 100° C. until the hydrogen peroxide is substantially consumed, and adding a monohydric alcohol with an alcoholysis catalyst to produce 3-chloro-4-hydroxytetrahydrofuran and 1:2-dichloro-3:4-dihydroxybutane.

References Cited in the file of this patent

UNITED STATES PATENTS

| | | |
|---|---|---|
| 2,538,072 | Zech | Jan. 16, 1951 |
| 2,785,185 | Phillips et al. | Mar. 12, 1957 |
| 2,861,084 | Stracher et al. | Nov. 18, 1958 |

OTHER REFERENCES

Heine et al.: J. Amer. Chem. Soc., vol. 75 (1953), pp. 4778–9.

Greenspan: "Modern Plastics," vol. 31, No. 7 (1954), pages 123 to 125.